United States Patent [19]

Dominguez et al.

[11] Patent Number: 4,521,581
[45] Date of Patent: Jun. 4, 1985

[54] POLYMER POLYOL PREPARED BY CROSSLINKING A LOW MOLECULAR WEIGHT POLYMER IN A POLYOL

[75] Inventors: Richard J. G. Dominguez; Michael Cuscurida, both of Austin, Tex.

[73] Assignee: Texaco Inc., White Plains, N.Y.

[21] Appl. No.: 472,344

[22] Filed: Mar. 4, 1983

[51] Int. Cl.$^3$ .................... C08G 18/22; C08G 18/67; C08L 75/00
[52] U.S. Cl. .................... 528/57; 252/182; 521/137; 521/140; 525/455; 528/75; 528/76; 528/77; 528/392
[58] Field of Search ............... 521/137, 140; 525/455; 528/75, 76, 77, 392, 57; 252/182

[56] References Cited

U.S. PATENT DOCUMENTS

| | | | |
|---|---|---|---|
| 3,287,330 | 11/1966 | Burt et al. | 528/392 |
| 3,304,273 | 2/1967 | Stamberger | 521/137 |
| 3,383,351 | 5/1968 | Stamberger | 524/762 |
| 3,405,162 | 10/1968 | Kuryla | 528/77 |
| 3,427,366 | 2/1969 | Verdal et al. | 525/126 |
| 3,514,499 | 5/1970 | Schallenberger et al. | 525/131 |
| 3,523,093 | 8/1970 | Stamberger | 521/137 |
| 3,673,168 | 6/1972 | Burke et al. | 526/212 |
| 3,758,426 | 9/1973 | Boivin et al. | 528/75 |
| 3,953,393 | 4/1976 | Ramlow et al. | 525/41 |
| 3,968,089 | 7/1976 | Cuscurida et al. | 528/50 |
| 4,104,236 | 8/1978 | Simroth | 521/137 |
| 4,111,865 | 9/1978 | Seefried, Jr. et al. | 521/137 |
| 4,152,309 | 5/1979 | Ijichi et al. | 528/75 |
| 4,172,825 | 10/1979 | Shook et al. | 521/137 |
| 4,316,991 | 2/1982 | Speranza et al. | 568/609 |
| 4,373,034 | 2/1983 | Speranza et al. | 521/174 |

OTHER PUBLICATIONS

Chem. Abstracts, vol. 91, 1979: 142024p, Japan, Kokai 79-77, 696, 5/79.
Chem. Abstracts, vol. 89, 1978: 181072f, Japan, Kokai 78-88, 845, 8/78.
Chem. Abstracts, vol. 87, 1977: 69538v, Japan, Kokai 77-44, 861, 4/77.
Chem. Abstracts, vol. 87, 1977; 85779e, Yatsu, Tadao, et al., Japan, Kokai 77-63, 991; 5/77.
Poly, bd® Liquid Resins, Product Bulletin BD-1, Arco Chem. Co.
Poly bd® Resins, Functional Liquid Polymers, Arco Chem. Co.
Lithene Product Data; Revertex, Ltd.
"Liquid Butadiene Telomers"; Bondy, et al., Revertex Ltd.
Richards, et al., Synthesis and Characterization of Hydroxy-Terminated Polybutadienes, Jan. 4, 1967.

*Primary Examiner*—Lester L. Lee
*Assistant Examiner*—Kriellion Morgan
*Attorney, Agent, or Firm*—R. A. Kulason; Jack H. Park; Kenneth R. Priem

[57] ABSTRACT

A method of making polymer polyols is disclosed wherein a relatively low molecular weight liquid polymer of an ethylenically unsaturated monomer is mixed with a polyol and crosslinked in the polyol. The relatively low molecular weight polymer which is mixed in the polyol may have a variety of microstructures since the low molecular weight polymer was prepared separate from the polyol.

11 Claims, No Drawings

POLYMER POLYOL PREPARED BY CROSSLINKING A LOW MOLECULAR WEIGHT POLYMER IN A POLYOL

BACKGROUND OF THE INVENTION

1. Field of the Invention

The present invention relates to polyols containing a separate polymer. They are usually referred to in the art as polymer polyols.

2. Description of the Prior Art

Polyurethanes constitute a broad class of polymeric materials having a wide range of physical characteristics. The polymers are produced through the interaction of a polyfunctional isocyanate with a polyfunctional chemical compound having an active hydrogen in its structure, such as a polyester or polyether or mixtures of two or more of such materials. The materials conventionally used contain two or more hydroxyl groups and are thus generally termed polyols.

It is known in the art that the addition of a high molecular weight polymer to polyurethane compositions will improve certain of the physical properties of the resulting polyurethane composition. There have been many efforts with respect to incorporating polymers into such polyurethane compositions. For example, U.S. Pat. No. 3,383,351 discloses the in situ polymerization of an ethylenically unsaturated monomer in the presence of the polyol component of a polyurethane composition. Prior art techniques include the method of polymerizing ethylenically unsaturated monomers in the presence of isocyanate terminated prepolymers to result in an isocyanate terminated polymer prepolymer. A description of this technique may be found in U.S. Pat. No. 3,968,089. Also, preparation of graft copolymer dispersions by in situ polymerization of a vinyl monomer in an unsaturated containing polyol is described, for example, in U.S. Pat. No. 3,953,393.

We have discovered a method whereby a polymer may be formed so as to achieve a degree of freedom not found in the prior art techniques.

SUMMARY OF THE INVENTION

The invention is a method for making polymer polyols which comprises polymerizing an ethylenically unsaturated monomer in a selected medium and stopping polymerization at a desired point. This polymer is then mixed with a polyol which is different from the medium previously used and crosslinked in situ in the polyol. The invention is also the resulting polymer polyol composition, the method for making polyurethanes from the composition and the resulting polyurethane.

DESCRIPTION OF THE PREFERRED EMBODIMENTS

The invention disclosed herein is to polymerize a monomer in a chosen medium, stop the polymerization at a chosen point and then disperse the relatively low molecular weight polymer in a polyol and subsequently crosslinking the polymer to the desired level. By this method, the microstructure of the initial polymer can be controlled by known techniques including a judicious choice of medium along with choice of initiators for the initial polymerization. This pre-engineered low molecular weight polymer is then dispersed in a polyol and crosslinked to the appropriate level, retaining the structural characteristics built into it. The prior art which polymerizes the monomer in the polyol does not allow for such engineering to be built into the polymer portion of the polymer polyol.

The monomers useful in practicing this invention are the polymerizable ethylenically unsaturated monomers characterized by the presence therein of at least one polymerizable ethylenic group. The monomers can be used singly to produce a homopolymer/polyol or in combination to produce a co-polymer/polyol.

These monomers are well known in the art and include the hydrocarbon monomers such as butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, cyclohexylstyrene, benzylstyrene and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, p-vinyl diphenyl sulfide, p-vinylphenyl phenyl oxide, and the like; the acrylic and substituted acrylic monomers such as methylacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, and the like; the vinyl esters and vinyl ethers, such as vinyl acetate, vinyl chloracetate, vinyl butyrate, isopropenyl acetate, vinyl formate, vinyl acrylate, vinyl methacrylate, vinyl methoxy acetate, vinyl benzoate, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1, 2-pyran, 2-butoxy-2'-vinyloxy diethyl ether, vinyl 2-ethylmercaptoethyl ether, vinyl methyl ketone, vinyl ethyl ketone, vinyl phenyl ketone, and the like; dimethyl fumarate, dimethyl maleate, monomethyl itaconate, dimethylaminoethyl methacrylate, glycidyl acrylate, dichlorobutadiene, vinyl pyridine, hydroxyethyl methacrylate, and the like. The compounds listed above are illustrative and not restrictive to the monomers suitable for use in this invention.

The ethylenically unsaturated monomers which are preferred in the practice of this invention include the hydrocarbon monomers such as butadiene, isoprene, styrene, α-methylstyrene, and the like; and the acrylic and substituted acrylic monomers which are non-reactive with isocyanato groups, such as methylacrylate, methyl methacrylate, hydroxyethyl methacrylate, acrylonitrile and methacrylonitrile.

The initial polymerization or co-polymerization of these monomers to low molecular weight liquids is accomplished by a variety of techniques known in the art. These low molecular weight polymers should be of molecular weights ranging from about 1,800 to about 8,000. One skilled in the art may choose the method of polymerization to suit the ultimate goal of microstructure control of this polymer. Free radical and cationic catalysts give polymers which are highly branched. However, anionic and Ziegler-Natta catalysts yield products which have a more linear structure.

Preferred low molecular weight polymers are obtained by the anionic polymerization or co-polymerization of ethylenically unsaturated monomers, the most preferred of which is butadiene. An example of these are LITHENE® liquid polymers of butadiene from Revertex Ltd, Temple Fields, Harlow, Essex in Great Britain. As described in product data, these preferred LITHENES are prepared by the anionic polymerization of butadiene. An organic lithium catalyst is used in a solvent. Toluene is described as a usual solvent. However, toluene is only one of many solvents which can be used. The monomer of butadiene has the structure $CH_2=CH-CH=CH_2$. By anionic polymerization of this butadiene monomer, three different types of structure are obtained.

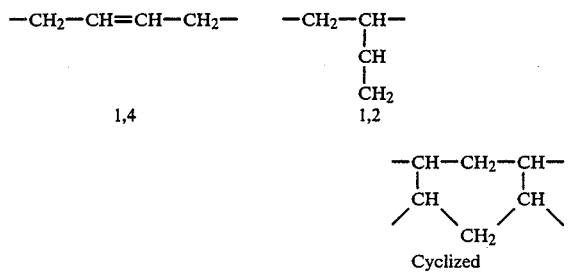

By controlling these structures by methods known in the art, the total microstructure of the polymer can be controlled. Therefore, those skilled in the art can choose what type of polymer they wish to then further crosslink in a polyol.

Other types of low molecular weight liquid polymers preferred for crosslinking in a polyol are hydroxyl terminated, have internal unsaturation and range from about 1,800 to 8,000 molecular weight. For example, Poly bd® Liquid Resins from ARCO Chemical Co., division of Atlantic-Richfield Co., are suitable and have the following published structures:

The polyether polyol components useful in preparing the polymer polyol composition include polyols having a functionality of from two to about six and having a molecular weight of from about 2,000 to 10,000, preferably from about 2,000 to 7,000. These polyether polyols are prepared by a well known process which involves the reaction of a polyhydric initiator such as trimethylolpropane, glycerol, 1,2,6-hexanetriol, sorbitol, pentaerythriotol, and the like, with an alkylene oxide such as ethylene oxide, propylene oxide and butylene oxide, or mixtures of ethylene oxide with propylene oxide and/or butylene oxide. This reaction is carried out in a well known manner with an alkoxylation catalyst, generally an alkali metal hydroxide such as potassium hydroxide. The alkoxylation reaction is continued until the product attains the desired molecular weight.

Especially preferred polyether polyols are the polyether triols.

Preferred polyether diols are, for example, polypropylene glycols or mixed polypropylene glycol/polyethylene glycol co-polymers having a molecular weight from about 2,000 to about 5,000. These materials are produced by reacting ethylene oxide, propylene oxide, or a butylene oxide, either sequentially or in admixture with an initiator such as, for example, ethylene glycol, propylene glycol or butylene glycol.

Other preferred polyols are those made by incorporating an epoxy resin internally in the polyol. These polyols are described, for example, in U.S. Pat. No. 4,316,991, which is incorporated herein by reference.

The polyether polyol and the pre-engineered low molecular weight liquid polymer are mixed together or dispersed and then further crosslinked by catalysis; for example, free radical catalysts or azo compounds. This crosslinking technique is generally carried out under the following conditions.

The crosslinking of the pre-engineered liquid polymer typically takes place at 100°-150° C., with a preferred temperature of 110°-140° C. The crosslinking may take place at atmospheric or near atmospheric conditions.

The examples which follow will illustrate the practice of our invention. However, these examples are not intended to limit the scope of the invention.

Homopolymers

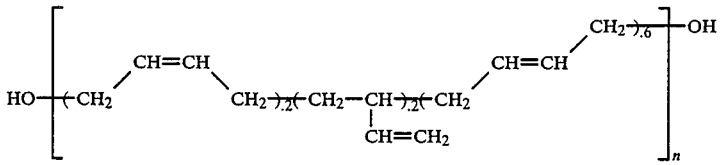

where n = 50.

Co-polymers

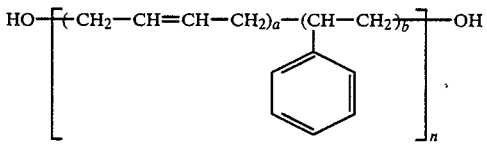

where a=0.75, b=0.25 and n=54. These polymers are suggested for use as a component suitable for reaction with polyisocyanates to form polyurethanes.

In our invention these hydroxyl terminated polymers are suitable for crosslinking in the polyol just as the non-hydroxyl terminated polymers described above. The same monomer groups useful for polymerizing to the nonhydroxyl terminated polymers are useful for polymerizing to obtain hydroxyl terminated polymers. The method of making these materials is known in the art.

EXAMPLE I

Into a 1-liter three-necked flask equipped with a stirrer, thermometer, condenser and nitrogen source were charged 320 g of a 5,500 molecular weight propylene oxide/ethylene oxide (PO/EO) adduct of glycerin (THANOL ® SF-5505; Texaco Chemical Co.), 80 g of a 5,000 molecular weight butadiene liquid polymer (LITHENE N4-5000; Rivertex, Ltd.), and 4.0 g of 2,5-dimethyl-2,5-di(t-butylperoxy)hexane (LUPERSOL 101; Lucidol Div., Pennwalt). Maintaining a nitrogen purge, the reaction mixture was heated at 125°-135° C. for five hours. The product was then stabilized with 1.3 g of 2,6-di-t-butyl-4-sec-butyl phenol (ISONOX 132; Schenectady Chemical Co.). The finished product was a white, opaque, viscous liquid which had the following properties. This polymer polyol has been stable for three months in glass.

Acid number, mg KOH/g : 0.015
Hydroxyl number, mg KOH/g : 32.6
Water, wt. % : 0.01
pH, 10:6 isopropanol/water : 6.8
Viscosity, 77° F., cps : 3720

A physical mixture of the above reactants had an intitial viscosity of 1800 cps at 77° F. and phase separated within a few days.

EXAMPLE II

This example will illustrate a scale-up preparation of Example I. Into a 10-gallon kettle were charged 8 pounds of THANOL SF-5505 polyol, 2 pounds of LITHENE N4-5000 and 45.4 g of LUPERSOL 101. The reactor was then evacuated and purged with pre-purified nitrogen. It was then heated at 128°-130° C. for three hours. The reaction was monitored by measuring the viscosity after each hour of reaction. Results were as follows.

| Time, Hour | Viscosity, 77° F., cps |
|---|---|
| 0 | 1860 |
| 1 | 2100 |
| 2 | 2100 |
| 3 | 2340 |

The product was then stabilized with 6.8 g of di-t-butyl-p-cresol. Basis GPC the product contained 10 area per cent of a polymer which had 2-3 times the molecular weight of the starting materials.

EXAMPLE III

This example will illustrate the use of the polybutadiene polymer polyol of Example II in the preparation of RIM elastomers. It will further show the improved hydrolytic stability and heat sag properties of elastomers prepared using these materials. These elastomers were prepared using an Accuratio machine.

| | A | B | C | D |
|---|---|---|---|---|
| Formulation, pbw | | | | |
| B-Component | | | | |
| THANOL ® SF-5505[1] | 12.8 | 14.4 | 15.2 | 16.0 |
| Polybutadiene polymer[2] | 3.2 | 1.6 | 0.8 | — |
| Ethylene glycol | 6.44 | 6.44 | 6.44 | 6.44 |
| PLURONIC ® F-98[3] | 0.22 | 0.22 | 0.22 | 0.22 |
| THANCAT ® DME[4] | 0.2 | 0.2 | 0.2 | 0.2 |
| Dibutyltin dilaurate[5] | 0.015 | 0.015 | 0.015 | 0.015 |
| FOMREZ ® UL-29[6] | 0.025 | 0.025 | 0.025 | 0.025 |
| A-Component | | | | |
| ISONATE ® 143L[7] | 29.49 | 29.49 | 29.49 | 29.49 |
| Quasi-prepolymer[8] | 5.72 | 5.72 | 5.72 | 5.72 |
| Isocyanate index | 1.04 | 1.04 | 1.04 | 1.04 |
| Properties of Elastomer: | | | | |
| Hydrolytic stability, (1 week in water at room temp) | | | | |
| Postcure 250° F. | | | | |
| ΔL | 0.035 | 0.023 | 0.034 | 0.042 |
| ΔWt | 0.45 | 0.46 | 0.51 | 0.57 |
| Postcure 325° F. | | | | |
| ΔL | 0.035 | 0.043 | 0.029 | 0.052 |
| ΔWt | 0.45 | 0.58 | 0.57 | 0.60 |
| Heat sag, in (325° F./30 min) | | | | |
| 6 inch overhang | 0.435 | 0.575 | 0.65 | 0.755 |
| Heat sag, in (250° F./30 min) | | | | |
| 4 inch overhang | — | 0.03 | 0.08 | 0.17 |

[1] 5,500 molecular weight PO/EO adduct of glycerin; Texaco Chemical Co.
[2] From Example II.
[3] 11,000 molecular weight 80:20 EO/PO diol; BASF Wyandotte.
[4] Dimethylaminoethanol; Texaco Chemical Co.
[5] SUL-4; Witco Chemical Co.
[6] Thioorganotin Compound; Witco Chemical Co.
[7] Liquid MDI; Upjohn Chemical Co.
[8] Isocyanate rich quasi-prepolymer; THANATE ® L-55-0; Texaco Chemical Co.

EXAMPLE IV

This example will illustrate the use of polybutadiene polymer polyol (prepared as in Example II) in the preparation of high resilience (HR) foams. It will further show the overall good properties of the foams. Formulation, details of preparation and properties are as follows.

| | A |
|---|---|
| Formulation, pbw | |
| THANOL ® SF-5505 | 60 |
| Polybutadiene polymer polyol | 40 |
| Water | 2.8 |
| Q2-5043 silicone[1] | 2.0 |
| THANCAT ® TD-33[2] | 0.25 |
| NIAX ® A-1[3] | 0.25 |
| THANCAT DM-70[4] | 0.25 |
| Dibutyltin dilaurate | 0.01 |
| 80:20 TDI/PAPI ®[5] | 35.1 |
| Isocyanate index | 1.02 |
| Details of Preparation | |
| Cream time, seconds | 6 |
| Rise time, seconds | 120 |
| Gel time, seconds | 195 |
| Properties | |
| Density, pcf | 2.4 |
| Tensile, psi | 13.4 |
| Elongation, % | 119 |
| Tear, pli | 1.3 |
| Compression set, 50% | 21.1 |
| 95% | 18.2 |
| Humid Aging (5 hours at 250° F.) | |
| Compression set, % | 22.1 |
| CLD loss, 50% | 22.0 |

[1] A product of Dow-Corning Corp.
[2] 33% triethylenediamine in propylene glycol; Texaco Chemical Co.
[3] bis-dimethylaminoethyl ether; Union Carbide Chemical Co.
[4] 70% dimorpholinodiethyl ether/30% N,N'—dimethylpiperazine; Texaco Chemical Co.
[5] 2.7 functionality polymeric isocyanate; a product of Mobay Chemical Co.

EXAMPLE V

This example will illustrate the polymerization of a hydroxyl terminated polybutadiene liquid polymer in THANOL SF-5505 polyol.

Into a 1-liter three-necked flask equipped with a stirrer, thermometer, condenser and nitrogen source were charged 400 g of THANOL SF-5505 polyol, 100 g of hydroxy terminated polybutadiene liquid polymer (Poly bd R-45M; ARCO Chemical Co.) and 5.0 g LUPERSOL 101. At this point the reactants had a viscosity of 1340 cps at 77° F. Maintaining a nitrogen purge the reactants were heated 4.75 hours at 128°–135° C. The reaction mixture was then cooled and stabilized with 0.5 g of ISONOX 132. The finished product was a white, opaque, viscous liquid which had the following properties.

Acid number, mg KOH/g : 0.13
Hydroxyl number, mg KOH/g : 36.6
Water, wt. % : 0.01
Viscosity, 77° F., cps : 6300
Peroxide, ppm : 1.95

EXAMPLE VI

Into a 1-liter three-necked flask equipped with a stirrer, thermometer, condenser and nitrogen source were charged 400 g of a 3,500 molecular weight propylene oxide/ethylene oxide/diglycidyl ether of Bisphenol A adduct of glycerin, 100 g of a 5,000 molecular weight butadiene liquid polymer (LITHENE N4-5000; Rivertex Ltd) and 5.0 g of LUPERSOL 101. Maintaining a nitrogen purge the reaction mixture was heated at 125°–135° C. for three hours. The product was then stabilized with 0.75 g of di-t-butyl-p-cresol. The finished product was a white, opaque, viscous liquid which had the following properties.

Hydroxyl number, mg KOH/g : 42.3
Viscosity, 77° F., cps : 1538

A physical mixture of the above reactants had a viscosity of 1275 cps at 77° F.

EXAMPLE VII

This example will show the use of the polymer polyol of Example VI in the preparation of flexible foam. It will further show the improved load bearing properties of foams made from this polyol as compared to those prepared from a 3,000 molecular weight propylene oxide/ethylene oxide of glycerin (THANOL ® F-3016; Texaco Chemical Co.) and the base polyol of Example VI. Load bearing properties were measured using a Chatillon gauge (33% indentation).

Formulations, details of preparation and foam properties are shown below.

|  | A | B | C | D |
|---|---|---|---|---|
| Formulation, pbw |  |  |  |  |
| THANOL F-3016 | 100 | — | 75 | — |
| 3,500 m.w. polyol of Ex. VI | — | 100 | — | 75 |
| Butadiene polymer polyol | — | — | 25 | 25 |
| Water | 4.0 | 4.0 | 4.0 | 4.0 |
| L-6202 silicone[1] | 1.0 | 1.0 | 1.0 | 1.0 |
| Stannous octoate (50% active) | 0.5 | 0.5 | 0.5 | 0.5 |
| THANCAT TD-33[2] | 0.3 | 0.3 | 0.3 | 0.3 |
| Toluene diisocyanate | 49.7 | 48.4 | 49.7 | 48.2 |
| Isocyanate index | 1.05 | 1.05 | 1.05 | 1.05 |
| Details of Preparation |  |  |  |  |
| Cream time, seconds | 12 | 12 | 12 | 12 |
| Rise time, seconds | 75 | 94 | 92 | 93 |
| Properties |  |  |  |  |
| Density, pcf | 1.55 | 1.63 | 1.63 | 1.69 |
| Chatillon gauge[3] (reading at 44% indentation, lb) | 5.7 | 6.45 | 6.2 | 7.45 |

[1] A product of Union Carbide Corp.
[2] Triethylenediamine in propylene glycol; a product of Texaco Chemical Co.
[3] Manual Model LIC compression tester, manufactured by John Chatillon and Sons.

We claim:

1. A method for making polymer polyols comprising
   (a) polymerizing an ethylenically unsaturated monomer with an anionic catalyst in a selected medium to a low molecular weight liquid polymer,
   (b) mixing the polymer from (a) in a polyol which is different from the medium of (a), and
   (c) crosslinking the polymer in the polyol.

2. A method as in claim 1 wherein the molecular weight of the polymer from step (a) is from about 1,800 to 8,000.

3. A method as in claim 1 wherein the polyol in step (b) has a molecular weight ranging from about 2,000 to 7,000.

4. A method for making polymer polyols comprising
   (a) polymerizing an ethylenically unsaturated monomer with an anionic catalyst in a selected medium to a low molecular weight liquid polymer,
   (b) mixing the polymer from (a) in a polyol made by incorporating an epoxy resin internally in the polyol and which is different from the medium of (a), and
   (c) crosslinking the polymer in the polyol.

5. A polymer polyol composition made by a method comprising
   (a) polymerizing an ethylenically unsaturated monomer with an anionic catalyst in a selected medium to a low molecular weight liquid polymer,
   (b) mixing the polymer from (a) in a polyol which is different from the medium of (a), and
   (c) crosslinking the polymer in the polyol.

6. A composition as in claim 5 wherein the molecular weight of the polymer from step (a) is from about 1,800 to 8,000.

7. A composition as in claim 5 wherein the polyol in step (b) has a molecular weight ranging from about 2,000 to 7,000.

8. A polymer polyol composition made by a method comprising
   (a) polymerizing an ethylenically unsaturated monomer with an anionic catalyst in a selected medium to a low molecular weight liquid polymer,
   (b) mixing the polymer from (a) in a polyol made by incorporating an epoxy resin internally in the polyol and which is different from the medium of (a), and
   (c) crosslinking the polymer in the polyol.

9. A method for making polyurethane comprising reacting an isocyanate with a polyol made by a method comprising
   (a) polymerizing an ethylenically unsaturated monomer with an anionic catalyst in a selected medium to a low molecular weight liquid polymer,
   (b) mixing the polymer with (a) in a polyol which is different from the medium of (a), and
   (c) crosslinking the polymer in the polyol.

10. A method for making polyurethanes comprising reacting an isocyanate with a polymer polyol made by a method comprising
    (a) polymerizing an ethylenically unsaturated monomer with an anionic catalyst in a selected medium to a low molecular weight liquid polymer,
    (b) mixing the polymer from (a) in a polyol made by incorporating an epoxy resin internally in the polyol and which is different from the medium of (a), and
    (c) crosslinking the polymer in the polyol.

11. A polyurethane composition made by reacting an isocyanate with a polymer polyol made by a method comprising
    (a) polymerizing an ethylenically unsaturated monomer with an anionic catalyst in a selected medium to a low molecular weight liquid polymer,
    (b) mixing the polymer from (a) in a polyol which is different from the medium of (a), and
    (c) crosslinking the polymer in the polyol.

* * * * *